(12) United States Patent
Rocquin et al.

(10) Patent No.: US 12,550,970 B2
(45) Date of Patent: Feb. 17, 2026

(54) FOOTWEAR ITEM, IN PARTICULAR FOR PRACTISING A SPORT

(71) Applicant: DECATHLON, Villeneuve d'Ascq (FR)

(72) Inventors: Mansuy Rocquin, Villeneuve d'Ascq (FR); Estelle Suschetet, Villeneuve d'Ascq (FR); Jacques Bourse, Villeneuve d'Ascq (FR); Eva Robert, Villeneuve d'Ascq (FR); Antoine Cullier, Villeneuve d'Ascq (FR)

( * ) Notice: Subject to any disclaimer, the term of this patent is extended or adjusted under 35 U.S.C. 154(b) by 0 days.

(21) Appl. No.: 18/698,409

(22) PCT Filed: Oct. 6, 2022

(86) PCT No.: PCT/EP2022/077846
§ 371 (c)(1),
(2) Date: Apr. 4, 2024

(87) PCT Pub. No.: WO2023/057587
PCT Pub. Date: Apr. 13, 2023

(65) Prior Publication Data
US 2024/0407497 A1  Dec. 12, 2024

(30) Foreign Application Priority Data

Oct. 7, 2021 (FR) ..................................... 2110629

(51) Int. Cl.
*A43B 23/02* (2006.01)
*A43B 1/14* (2006.01)
(Continued)

(52) U.S. Cl.
CPC ............... *A43B 13/12* (2013.01); *A43B 1/14* (2013.01); *A43B 13/02* (2013.01); *A43B 23/0205* (2013.01); *A43B 23/0215* (2013.01)

(58) Field of Classification Search
CPC ........... A43B 13/02; A43B 13/04; A43B 1/14; A43B 23/0205; A43B 23/0215
(Continued)

(56) References Cited

U.S. PATENT DOCUMENTS

| 5,728,744 A | 3/1998 | Okada et al. |
| 10,179,850 B2 * | 1/2019 | Kusanose ........... C08L 23/0853 |

(Continued)

FOREIGN PATENT DOCUMENTS

| EP | 3081109 A1 | 10/2016 |
| FR | 2993757 A1 | 1/2014 |

OTHER PUBLICATIONS

English language abstract of FR2993757.

*Primary Examiner* — Marie D Bays

(57) ABSTRACT

The present invention relates to a footwear article (10), comprising:
a upper (30), a majority by mass of the upper or a majority of the surface of the upper is made of a main upper material and possibly of one or more auxiliary upper material(s);
a sole (20), a majority by mass of the sole is made of a main sole material and possibly of one or more auxiliary sole material(s);
and the main upper material, and possibly the auxiliary upper material(s), and the main sole material, and possibly the auxiliary sole material(s), is/are selected among the following materials: the polyolefins, the styrenic thermoplastic elastomers, the olefinic thermoplastic elastomers, and the vulcanized thermoplastic elastomers.
The present invention also relates to a method for manufacturing such a footwear article (10).

20 Claims, 3 Drawing Sheets

(51) Int. Cl.
  *A43B 13/02*   (2022.01)
  *A43B 13/12*   (2006.01)

(58) Field of Classification Search
  USPC .................................................. 36/25 R, 45
  See application file for complete search history.

(56) References Cited

U.S. PATENT DOCUMENTS

| | | | |
|---|---|---|---|
| 2010/0325921 A1 | 12/2010 | Wu | |
| 2018/0332920 A1* | 11/2018 | Burch | A43B 23/026 |
| 2018/0368525 A1* | 12/2018 | Luchi | B32B 25/042 |
| 2019/0366590 A1 | 12/2019 | Farris et al. | |
| 2021/0022445 A1 | 1/2021 | Dua et al. | |
| 2021/0039306 A1 | 2/2021 | Busbee | |
| 2021/0145116 A1* | 5/2021 | Kvamme | B29D 35/122 |
| 2021/0147650 A1* | 5/2021 | Levy | A43B 1/10 |
| 2021/0148013 A1* | 5/2021 | Baranek | D06M 15/333 |
| 2021/0274887 A1* | 9/2021 | Halligan | A43C 1/04 |
| 2021/0277199 A1* | 9/2021 | Archer | B25J 15/0019 |
| 2021/0381142 A1* | 12/2021 | MacGilbert | A43B 1/04 |
| 2022/0095744 A1* | 3/2022 | Nabernik | A43B 23/0235 |
| 2022/0240624 A1* | 8/2022 | Danby | D04B 1/18 |
| 2022/0267554 A1* | 8/2022 | Chang | B32B 38/00 |
| 2022/0356608 A1* | 11/2022 | Toronjo | D03D 1/00 |
| 2022/0400807 A1* | 12/2022 | Bauer | B32B 27/16 |
| 2023/0082467 A1* | 3/2023 | Chang | C08J 9/122 |
| | | | 428/51 |
| 2023/0091558 A1* | 3/2023 | Chang | D04H 1/43916 |
| 2023/0094966 A1* | 3/2023 | Davis | A43C 15/16 |
| | | | 36/28 |
| 2023/0129224 A1* | 4/2023 | Berrian | D04B 1/22 |
| | | | 36/45 |

* cited by examiner

[Fig.1]
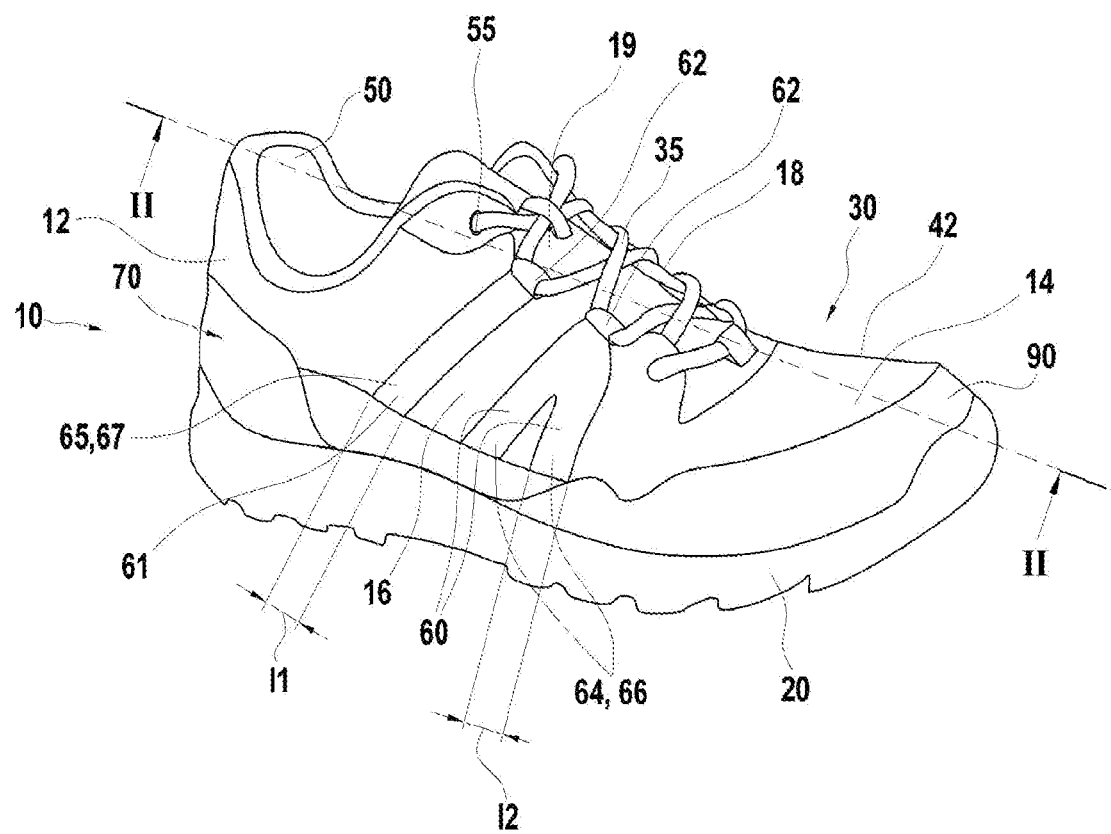
[Fig.2]
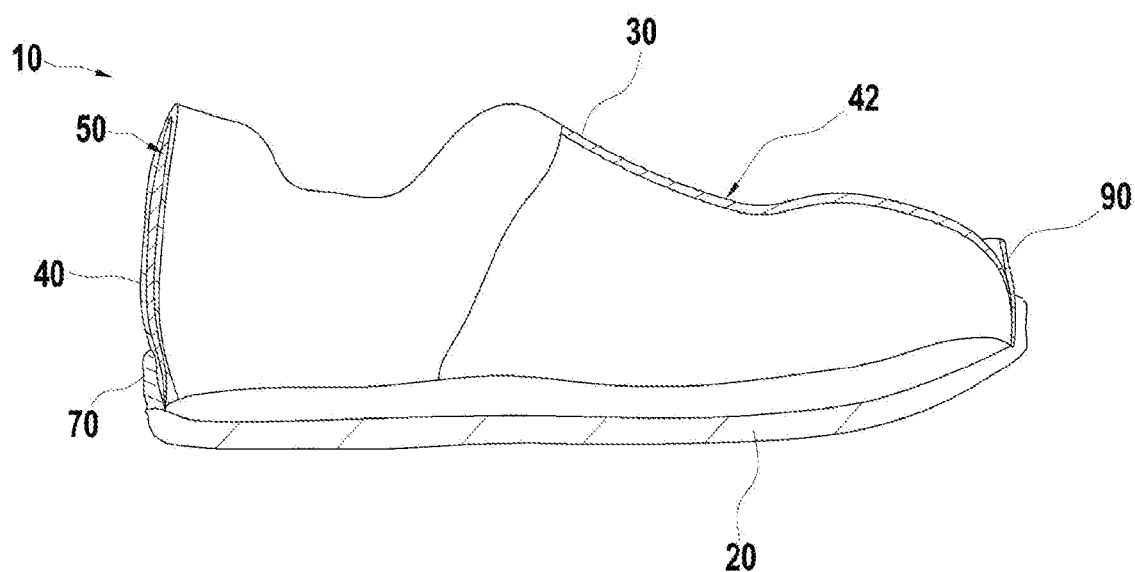

[Fig.3]
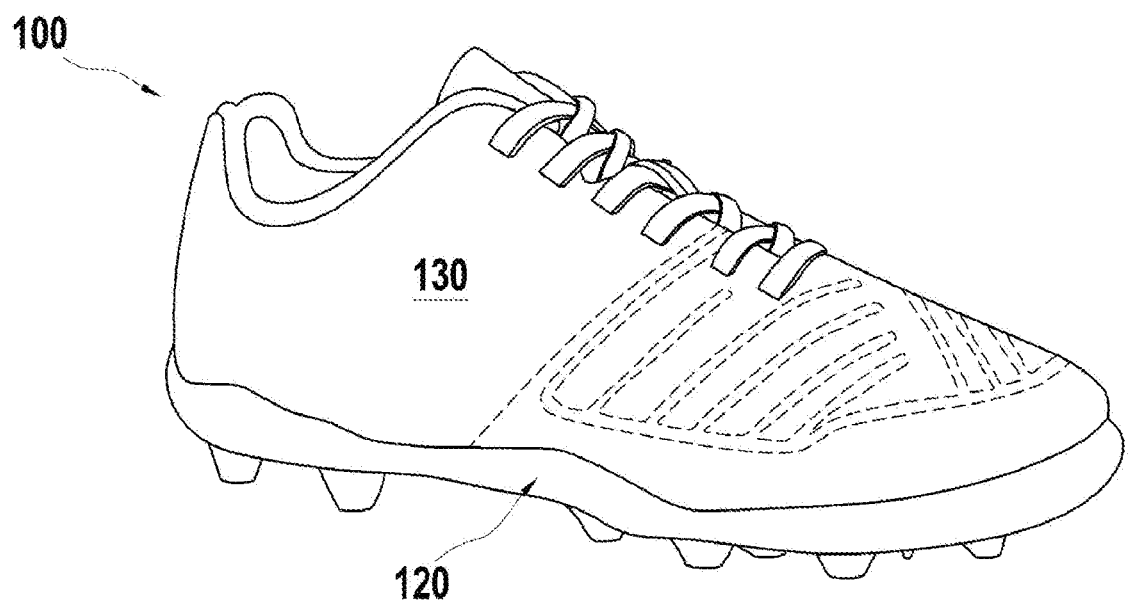
[Fig.4]
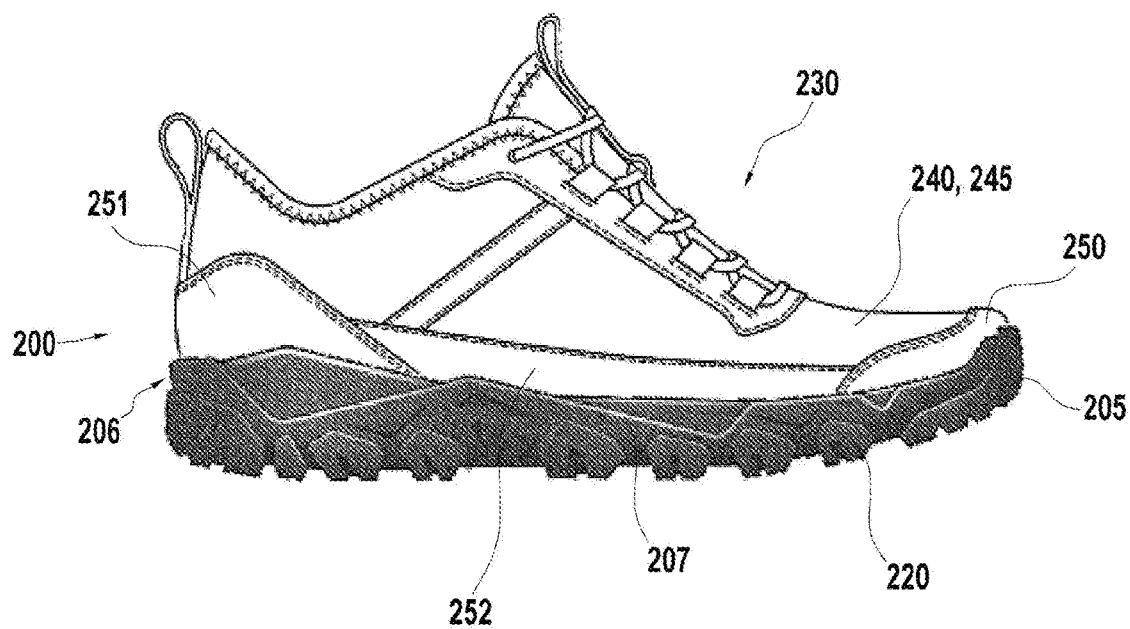

[Fig.5]

| Tests | Example 1 | Example 2 | Example 3 | Example 4 | Example 5 |
|---|---|---|---|---|---|
| Breaking strength (MPa) ISO 37:2017 | 8.0 | 10.7 | 9 | 9.3 | 9.6 |
| Elongation at break (%) ISO 37:2017 | 517 | 617 | 691 | 641 | 538 |
| Hardness (Shore A) ISO 868:2003 | 80 | 87 | 86 | 85 | 85 |
| Abrasion (mm$^3$) ISO 4649 - method A:2017 | 88 | 48 | 69 | 72 | 58 |
| Density (Kg/liter) ISO 2420: 2017 | 0.88 | 0.91 | 0.88 | 0.91 | 0.88 |

FOOTWEAR ITEM, IN PARTICULAR FOR PRACTISING A SPORT

TECHNICAL FIELD

The present invention relates to the technical field of footwear articles, particularly shoes, more particularly sports shoes, and the methods for manufacturing and recycling said articles.

STATE OF THE ART

Footwear articles, particularly shoes, and more particularly sports shoes, generally comprise a sole and an upper manufactured from multiple components in very varied materials, because they perform different functions.

The components of the sole and of the upper perform foot cushioning, recovery, protection and support function, heat and perspiration removal management function, waterproof function, abrasion resistance function or flexibility function, etc., depending on different areas of the footwear article.

These different components are in different materials, and assembled by different techniques, for example by stitching, bonding or welding.

The multiplicity of the nature of the components complicates the footwear article manufacturing method and requires a lot of energy (for example heat for welding, electricity consumption for machine tools, water consumption, etc.) for its production, which impacts its greenhouse gas, particularly carbon dioxide, balance.

Moreover, once these footwear articles are used, they are buried underground or incinerated, which further contributes to negatively impacting the carbon dioxide balance of the life cycle of a footwear article. It is estimated that only 2% of the volume of footwear articles consumed annually in Europe is recycled, at least partly.

When the footwear articles are recycled, they are recycled in methods with low value-added and with limited outlets in terms of volume, for example for the manufacture of shock-absorbing playgrounds.

Footwear articles made of biodegradable material which will decompose naturally in a few months are therefore proposed. However, this type of material is still limited and is not satisfactory for sports shoes that must meet specific and varied performance criteria depending on the types of sport.

Shoes comprising removable components thus facilitating their separation and therefore their recycling are known. However, this type of shoe is not satisfactory in terms of technical functionalities and various possible visual aesthetics.

EP 3.081.109 A1 relates to a shoe comprising an upper and a sole, whose mass majority is made of a thermoplastic base material selected among the thermoplastic polyurethane, the polyamide, the polyethylene terephthalate or the polybutylene terephthalate. The materials listed above may be difficult to recycle, particularly the polyurethane. Indeed, the polyurethane tends to degrade over time through oxidation and to turn yellow. Furthermore, it is necessary to dry the TPU granules before transforming them in order to maintain their original properties. In addition, the melting temperatures of these materials are high, around 180° C. for TPU, and of the order of 230° C.-260° C. for the polyamides and the polyesters. The temperatures necessary for the hot-transformation of the polyesters and the polyamides being higher than those necessary for the hot-transformation of the polyurethanes, the hot-shaping of plastic granules resulting from a mixture of TPU, with polyamides or polyesters, degrade the properties of the polyurethanes. Furthermore, these polymer materials are expensive, little available and have low potential for reuse. Indeed, these materials are rarely used, and when they are implemented, they are used in high value-added applications so that virgin materials—without any pollutants—are favored.

FR 2 993 757 A1 relates to a liquid-impermeable boot having a sole portion and an upper portion in one piece in at least one polymer material chosen among cross-linked materials such as thermoplastics. FR 2 993 757 A1 does not concern the shoes, in particular sports shoes. FR 2 993 757 A1 proposes a system for removably fixing the internal slipper relative to the outer boot, and does not address the problem of the recycling of a footwear article. Moreover, the main thermosetting materials such as rubber are mentioned in an equivalent manner alongside the thermoplastic materials for the manufacture of the outer boot.

US 2019/0366590 A1 relates to a method for manufacturing a shoe segment from various waste plastic materials comprising the thermoplastic elastomers or the ethylene-vinyl-acetate. The method comprises the addition of a foaming agent to the recycled starting composition to manufacture a sole. The shoe segment is always a sole. US 2019/0366590 A1 does not give any information on the composition of a shoe targeting both the sole and the upper so that the upper and the sole are recycled in the same recycling method without being separated.

There is therefore a need to reduce greenhouse gas emissions produced during the life cycle of a footwear article, that is to say extending from its manufacture to its disposal.

There is also a need for a footwear article which is able to be recycled entirely or at least partly in a value-added recycling method, and thus in particular in the manufacture of a footwear article, particularly a shoe, more particularly a sports shoe.

There is also a need to provide an approach to limit the amount of resources consumed (heating, electricity, water, landfills, etc.).

A footwear article manufactured from materials that can be recycled in numerous end applications and that can be recycled several times without significant degradation of their properties is also sought.

DISCLOSURE OF THE INVENTION

The present invention overcomes all or part of the aforementioned problems in that it relates, according to a first aspect, to a footwear article, particularly a shoe, more particularly a sports shoe, advantageously comprising, more advantageously essentially consisting of, even more advantageously consisting of:
  an upper, a majority by mass of the upper or a majority of the surface of the upper is made of a main upper material, and possibly of one or more auxiliary upper material(s);
  a sole, a majority by mass of the sole is made of a main sole material, and possibly of one or more auxiliary sole material(s);
and the main upper material, and possibly the auxiliary upper material(s), is/are selected among the following materials: the polyolefins, the styrenic thermoplastic elastomers, the olefinic thermoplastic elastomers and the vulcanized thermoplastic elastomers; and
the main sole material, and possibly the auxiliary sole material(s), is/are selected among the following materials:

the polyolefins, the styrenic thermoplastic elastomers, the olefinic thermoplastic elastomers and the vulcanized thermoplastic elastomers.

In the present text, it is meant by "main list" the list comprising the following materials: the polyolefins, the styrenic thermoplastic elastomers, the olefinic thermoplastic elastomers, and the vulcanized thermoplastic elastomers.

Advantageously, the main upper material, and possibly the auxiliary upper material(s), and the main sole material, and possibly the auxiliary sole material(s) is/are selected among the same materials, of a similar nature, which are compatible with each other, thus facilitating their adhesion, and the manufacture of the footwear article but also its recycling. Indeed, it is not necessary to separate all the components of the footwear article to recycle it. The recycling can be performed in a single step by shredding the footwear article then by forming granules from said shreds. The inventors have surprisingly found that the main sole and upper materials listed above have the advantage that they can be presented in very different forms in shoe use and can be recycled several times.

Advantageously, the main, and possibly the auxiliary, upper and sole materials are selected so that the at least partly recycled granules are able to be transformed by any plastic shaping (in particular hot-shaping) technique, for example by injection molding, by injection foaming, by extrusion molding, by extrusion blow-molding, by thermoforming or by thermomolding. The granules derived from the footwear article according to the invention can be used in the manufacture of a sole or of a shoe component (such as a rear counter, a front toe box, or a lateral reinforcement) or in the manufacture of a yarn (for example by extrusion spinning) for the manufacture of a textile component (for example the manufacture of an upper component or of the entire upper by knitting or weaving) or of a foam component. The granules derived from the footwear article can also be used in the manufacture of a boot.

Said granules can also be transformed into a non-woven fabric, for example by a technique called Meltblown or Spunbond technique or by their combination, such as a non-woven fabric called SMS (Spunbond/Meltblown/Spunbond) for example.

The main upper and sole materials, and possibly the auxiliary upper and/or sole material(s), selected in the present invention are thermoplastic and have the advantage of being derived from olefins. These materials can thus be advantageously hot-transformed several times without their properties deteriorating significantly, particularly because of the oxidation caused by air and/or humidity. This ability allows them to improve the longevity of their recyclability cycle unlike some polymer materials, such as the polyurethanes in particular, which oxidize over time.

Advantageously, the footwear article can thus be recycled several times.

The main upper material may be identical to or different from the main sole material.

The auxiliary upper material(s) is/are preferably different from the main upper material and/or from the main sole material.

The auxiliary upper material(s) are preferably different from each other.

The auxiliary sole material(s) is/are preferably different from the main sole material and/or from the main upper material.

The auxiliary sole material(s) are preferably different from each other.

It is meant by "the main or auxiliary upper material is identical to the main or auxiliary sole material" that the main/auxiliary upper material is in the same base polymer material as that of the main/auxiliary sole material. The same reasoning applies between two auxiliary upper or sole materials that would be identical or different.

It is meant by "the main or auxiliary upper material is different from the main or auxiliary sole material" that the main/auxiliary upper material is not in the same base polymer material as that of the main/auxiliary sole material.

Preferably, the main upper material and/or the main sole material is/are chosen among the polyolefins, and/or the olefinic thermoplastic elastomers, and/or the styrenic thermoplastic elastomers and/or the vulcanized thermoplastic elastomers.

In one embodiment, the main upper material is a polyolefin or a styrenic thermoplastic elastomer or an olefinic thermoplastic elastomer or a vulcanized thermoplastic elastomer, preferably a polyolefin or an olefinic thermoplastic elastomer or a vulcanized thermoplastic elastomer, more preferably a polyolefin.

In one embodiment, the main sole material is a polyolefin or a styrenic thermoplastic elastomer or an olefinic thermoplastic elastomer or a vulcanized thermoplastic elastomer, preferably a polyolefin or a styrenic thermoplastic elastomer or a vulcanized thermoplastic elastomer, more preferably a polyolefin or a styrenic thermoplastic elastomer, in particular a styrenic thermoplastic elastomer.

Preferably, the auxiliary upper material(s) is/are selected among the polyolefins and/or the styrenic thermoplastic elastomers and/or the olefinic thermoplastic elastomers and/or the vulcanized thermoplastic elastomers.

Preferably, the auxiliary sole material(s) is/are selected among the polyolefins and/or the styrenic thermoplastic elastomers and/or the olefinic thermoplastic elastomers and/or the vulcanized thermoplastic elastomers.

Upper

Preferably, the upper comprises a forefoot region configured to cover in whole or in part the front of the foot, and/or a hindfoot region configured to cover in whole or in part the hindfoot, and/or a medial region configured to cover in whole or in part a medial side of the foot, and/or a lateral region configured to cover in whole or in part a lateral side of the foot, and/or an instep region configured to cover in whole or in part the instep, and/or a leg region configured to cover in whole or in part the leg.

Advantageously, the upper comprises (possibly consists of) the main upper material, and possibly one or more auxiliary upper material(s), in particular said auxiliary upper material(s) is/are different from the main upper material and possibly different from each other.

For example, the main upper material can be a polyolefin, and a first auxiliary upper material can be an olefinic thermoplastic elastomer or a vulcanized thermoplastic elastomer.

For example, the main upper material can be the polypropylene or the polyethylene, and the upper comprises a first auxiliary upper material, different from the main upper material, chosen among the polypropylene and the polyethylene. The main upper material can thus be the polypropylene and the first auxiliary upper material can be the polyethylene.

In one embodiment, the footwear article is a shoe, and the main upper material is a polyolefin, preferably the polypropylene or the polyethylene.

In one embodiment, the main upper material is different from the main sole material, and the sole also comprises a first auxiliary sole material identical to the main upper material (particularly said first auxiliary sole material does not constitute the major part in the sole). Preferably, the main upper material is a polyolefin, the main sole material is a styrenic thermoplastic elastomer, and the first auxiliary sole material is a polyolefin.

The main upper material and/or the main sole material and/or the auxiliary upper material(s) and/or the auxiliary sole material(s) can be one or more material(s) recycled from a sole and/or from the upper of another shoe or of a boot and/or from plastic(s) and/or be derived from the biomass.

The upper can comprise (in particular consist of) one or more upper component(s) comprising (particularly consisting of) said main upper material and/or one or more auxiliary upper material(s).

An upper component can be a textile component, or a reinforcing component, or a component for lacing, or a cushioning component, or a cellular component such as a foam, or a lace, or an eyelet, or a front toe box, or a rear or lateral counter, or a combination thereof.

The textile component can be a fabric, a knit, a nonwoven fabric, a braid, a tow, a fiber spun yarn, a multifilament yarn, a monofilament yarn, a set of fibers, or a combination thereof.

The textile component can be a textile (a knit or a fabric for example) in three dimensions, that is to say comprising top and bottom textile panels connected by intermediate yarns extending between said textile panels.

The textile component can be a knitted component, for example knitted on a flat knitting machine, or on a warp knitting machine, or on a circular warp or weft knitting machine, in particular of small diameter.

The textile component can be a knitted tube, particularly a knitted sock comprising a knitted heel portion.

Preferably, the upper comprises one or more upper component(s) assembled by bonding, stitching, or welding (for example by ultrasound or by high frequency).

Preferably, the upper comprises a textile component of unitary textile construction, particularly of unitary knitted or woven construction, said component comprising a forefoot region and/or a hindfoot region and/or a lateral region and/or a medial region and/or an instep region.

It is meant by "unitary textile construction" that the textile component does not comprise any stitch(es) or weld(s) other than those possibly necessary for its shaping, for example to join edges.

In one embodiment, the upper comprises a cellular component, particularly a foam, and/or foam beads, comprising a material selected among a polyolefin, an olefinic thermoplastic elastomer, or a vulcanized thermoplastic elastomer, preferably an olefinic thermoplastic elastomer or a polyolefin, more preferably a polyolefin. Said material can be the main upper material or an auxiliary upper material.

Preferably, the upper comprises a cellular component, particularly a foam, and/or foam beads, comprising the main upper material.

In one embodiment, the mass fraction of said main upper material in the upper is greater than or equal to 20%, preferably greater than or equal to 30%, more preferably greater than or equal to 40%.

Preferably, the mass fraction of said main upper material in the upper is less than or equal to 90%, particularly less than or equal to 80%, more particularly less than or equal to 70%, particularly less than or equal to 60%.

Alternatively, the mass fraction of said main upper material in the upper can be greater than or equal to 60%, preferably greater than or equal to 70%, more preferably greater than or equal to 80%, preferably greater than or equal to 90%.

In one embodiment, the fraction of surface occupied by the main upper material in the upper is greater than or equal to 30%, preferably greater than or equal to 40%, more preferably greater than or equal to 50%.

Preferably, the fraction of surface occupied by the main upper material in the upper is less than or equal to 90%, particularly less than or equal to 80%, more particularly less than or equal to 70%.

Alternatively, the fraction of surface occupied by the main upper material in the upper can be greater than or equal to 60%, preferably greater than or equal to 80%, more preferably greater than or equal to 90%.

Preferably, the fraction of surface occupied by the main upper material and by one or more auxiliary upper material(s) in the upper is greater than or equal to 60%, more preferably greater than or equal to 70%, preferably greater than or equal to 80%.

In one embodiment, the upper comprises the main upper material and a first auxiliary upper material, the mass fraction of the first auxiliary upper material in the upper is greater than or equal to 5%, preferably greater than or equal to 20%.

The mass fraction of the first auxiliary upper material in the upper is preferably less than or equal to 60%, preferably less than or equal to 50%, more preferably less than or equal to 40%.

In one embodiment, the upper comprises the main upper material and one or more auxiliary upper material(s), particularly a first and/or a second auxiliary upper material; the ratio of the mass of said main upper material and of the mass of the auxiliary upper material(s), to the total mass of the upper is greater than or equal to 50%, preferably greater than or equal to 60%, more preferably greater than or equal to 70%, preferably greater than or equal to 80%, particularly greater than or equal to 90%.

Optionally, the ratio of the mass of said main upper material and of the mass of the auxiliary upper material(s), to the total mass of the upper is less than or equal to 90% or 80%.

Advantageously, the upper comprises a first auxiliary upper material which is: a polyolefin or an olefinic thermoplastic elastomer or a vulcanized thermoplastic elastomer or a styrenic thermoplastic elastomer; preferably a polyolefin or an olefinic thermoplastic elastomer or a vulcanized thermoplastic elastomer; still preferably a polyolefin.

Advantageously, the upper comprises a first auxiliary upper material and a second auxiliary upper material which is a polyolefin or an olefinic thermoplastic elastomer or a vulcanized thermoplastic elastomer or a styrenic thermoplastic elastomer; preferably a polyolefin or an olefinic thermoplastic elastomer or a vulcanized thermoplastic elastomer; still preferably a polyolefin.

Preferably, the first auxiliary upper material is different from the second auxiliary upper material.

In one embodiment, the footwear article is a shoe, and the main upper material is a polyolefin, particularly the polypropylene or the polyethylene, optionally the upper further comprises a first auxiliary upper material, particularly a polyolefin, for example the polypropylene or the polyethylene, or an olefinic thermoplastic elastomer or a vulcanized thermoplastic elastomer or a styrenic thermoplastic elastomer.

Preferably, the mass fraction of the main upper material in the upper is greater than or equal to 40% and less than or equal to 80%, more preferably less than or equal to 60%.

Preferably, the mass fraction of the first auxiliary upper material in the upper is greater than or equal to 5%, more preferably less than or equal to 40%, more preferably less than or equal to 30%; for example comprised between 25% and 40%.

Preferably, the surface fraction of the main upper material which is a polyolefin, particularly the polypropylene, in the upper, is greater than or equal to 45%. More preferably, the surface fraction of the main upper material and of a first auxiliary upper material which is a polyolefin, particularly the polyethylene, in the upper, is greater than or equal to 70%. Particularly, the surface fraction of a second auxiliary upper material, which is an olefinic thermoplastic elastomer or a styrenic thermoplastic elastomer or a vulcanized thermoplastic element, in the upper, is greater than or equal to 15%, particularly less than or equal to 30%.

In one embodiment, the footwear article is a shoe, and the main upper material is an olefinic thermoplastic elastomer or a vulcanized thermoplastic elastomer, optionally the upper further comprises a first auxiliary upper material, particularly which is a polyolefin, for example the polypropylene or the polyethylene.

Preferably, the mass fraction of the main upper material in the upper is greater than or equal to 40% and less than or equal to 80%, more preferably less than or equal to 60%.

Preferably, the mass fraction of the first auxiliary upper material in the upper is greater than or equal to 5%, more preferably greater than or equal to 20%, particularly greater than or equal to 30% and less than or equal to 50%, more particularly greater than or equal to 35% and less than or equal to 45%.

Sole

The sole comprises (particularly consists of) the main sole material and possibly one or more auxiliary sole material(s), in particular different from the main sole material.

Said auxiliary sole material(s) is/are preferably chosen among the polyolefins and/or the styrenic thermoplastic elastomers and/or the olefinic thermoplastic elastomers and/or the vulcanized thermoplastic elastomers.

For example, the main sole material can be a styrenic thermoplastic elastomer and the sole comprises a first auxiliary sole material, which is a polyolefin, for example the polypropylene or the polyethylene.

Advantageously, the sole comprises a first auxiliary sole material which is a polyolefin or an olefinic thermoplastic elastomer or a vulcanized thermoplastic elastomer or a styrenic thermoplastic elastomer; preferably a polyolefin or a styrenic thermoplastic elastomer or a vulcanized thermoplastic elastomer.

Preferably, the mass fraction of the main sole material in the sole is greater than or equal to 25%, more preferably greater than or equal to 40%, preferably greater than or equal to 50%, more preferably greater than or equal to 60%.

Preferably, the mass fraction of the main sole material in the sole is less than or equal to 80%.

Preferably, the mass fraction of the first auxiliary sole material, for example the polypropylene or the polyethylene, in the sole is greater than or equal to 10%, more preferably less than or equal to 40%, preferably less than or equal to 30%, for example comprised between 15% and 25% (upper and lower bounds included).

In one embodiment, the sole comprises the main sole material, and possibly one or more auxiliary sole material(s), in particular a first and/or a second auxiliary sole material, the ratio of the mass of the main sole material and possibly of the mass of the auxiliary sole material(s), to the total mass of the sole is greater than or equal to 30%, preferably greater than or equal to 40%, more preferably greater than or equal to 50%, preferably greater than or equal to 60%, more preferably greater than or equal to 70%, preferably greater than or equal to 80%, particularly greater than or equal to 90%.

Optionally, the ratio of the mass of the main sole material and possibly of the mass of the auxiliary sole material(s), to the total mass of the sole is less than or equal to 90%, particularly less or equal to 80%, more particularly less than or equal to 70%.

In one embodiment, the footwear article is a shoe, and the main sole material is a styrenic thermoplastic elastomer, for example the SEBS or the SBS, possibly grafted, optionally the sole further comprises a first auxiliary sole material, particularly a polyolefin, for example the polypropylene or the polyethylene.

Preferably, the mass fraction of the main sole material is greater than or equal to 55% and less than or equal to 70%.

Preferably, the mass fraction of the first auxiliary sole material is greater than or equal to 5% and less than or equal to 35%, in particular greater than or equal to 10% and less than or equal to 30%.

In one embodiment, the main sole material is a styrenic thermoplastic elastomer, preferably the SEBS or the SBS, and the sole comprises a first auxiliary sole material which is a styrenic thermoplastic elastomer (different from the main sole material), preferably the SEBS or the SBS. The sole can comprise a second auxiliary sole material which is a polyolefin, for example the PP or the PE.

In one embodiment, the main sole material is a vulcanized thermoplastic elastomer, optionally the sole further comprises a first auxiliary sole material, particularly a styrenic thermoplastic elastomer, for example the SEBS or the SBS, possibly grafted.

Preferably, the mass fraction of the main sole material in the sole is greater than or equal to 40% and less than or equal to 85%, more preferably greater than or equal to 30%, preferably greater than or equal to 40%, in particular greater than or equal to equal to 55%.

Preferably, the mass fraction of the first auxiliary sole material in the sole is greater than or equal to 8%, more preferably less than or equal to 30%, for example between 15% and 25%.

In one embodiment, the main sole material is a polyolefin, particularly it is polypropylene.

Preferably, the mass fraction of the main sole material in the sole is greater than or equal to 50%, more preferably greater than or equal to 80%, in particular greater than or equal to 90%, for example of the order of 100%.

Preferably, when the sole comprises one or more auxiliary sole material(s), this/these is/are preferably embedded, such as one or more filler(s), in a polymer matrix formed by the main sole material.

The sole according to the invention can be/can comprise an outsole or a midsole or a combination thereof.

In one embodiment, the footwear article comprises an outsole and a midsole, particularly the midsole is a removable sole.

The midsole can be removably disposed in a foot-receiving space of the footwear article so as to come under the foot of the user.

The midsole can also act as an insole.

The sole according to the invention can comprise (consist of) one or more sole component(s) comprising (particularly consisting of) said main sole material and/or one or more auxiliary sole material(s).

A sole component can be an outsole, a midsole, an insole, a cushioning heel component (for example a donut), a textile component (as defined above with reference to the upper), a functional device providing stability, or a reinforcing or cushioning insert, or a cellular component, particularly a foam or a set of foamed and optionally agglomerated and/or bonded beads.

In one embodiment, the sole comprises/is a midsole comprising an external face coming into direct contact with the ground.

Advantageously, the midsole is configured to perform the function of outsole. The footwear article therefore does not comprise an outsole.

The midsole is preferably a one-piece component.

A foamed midsole with good abrasion resistance will be preferably chosen.

In one embodiment, the sole comprises an outsole component, preferably comprises (or is) an outsole, having a density (g/cm$^3$) greater than or equal to 0.85; preferably less than or equal to 1.30.

In one embodiment, the sole comprises a midsole component, preferably comprises (or is) a midsole, having a density (g/cm$^3$) greater than or equal to 0.10; preferably less than or equal to 0.90; more preferably having a density less than or equal to 0.50; in particular less than or equal to 0.40.

In one embodiment, the sole comprises a midsole component, preferably comprises (or is) a midsole, having a density (g/cm$^3$) greater than 0.50 and less than or equal to 0.85; particularly less than or equal to 0.75.

In one embodiment, the footwear article comprises an injected outsole, particularly comprising the main sole material (for example possibly grafted SEBS) and possibly a first auxiliary sole material (for example PP or PE), and an injected midsole, particularly directly on the outsole still in a softened state.

The midsole comprises the main sole material (for example possibly grafted SEBS) and possibly the first auxiliary sole material (for example PP or PE), mixed with at least one foaming agent. The outsole and the midsole are manufactured by bi-injection.

In one embodiment, the shoe comprises an insole, particularly disposed in the foot-receiving space of the shoe so as to come under the foot when the shoe is worn.

The insole is preferably removable.

This arrangement is advantageous when the sole is injected onto the upper. Indeed, when an insole is already present during the injection method, it can be crushed and thus lose its foot-accommodating properties. The use of a removable insole allows overcoming this problem.

The insole can advantageously comprise agglomerated foam beads, more preferably said foam beads comprise (in particular are) a polyolefin, in particular polyethylene, a vulcanized thermoplastic elastomer, or an olefinic thermoplastic elastomer, or a combination thereof.

The insole can advantageously comprise a foam comprising a polyolefin, particularly a polyethylene. Said foam can be laminated with a textile, optionally between two textiles. Said textile(s) comprising polyolefin yarns and/or fibers.

Main and/or Auxiliary Upper and/or Sole Material(s)
Polyolefins

The polyolefin(s) mentioned in the present text, particularly for the main upper material and/or the main sole material and/or the auxiliary upper and/or or sole material(s), is/are chosen among the polyolefin homopolymers, optionally grafted, the polyolefin copolymers or terpolymers, optionally grafted.

The polyolefin copolymers comprise two olefinic repeating units, optionally grafted.

The polyolefin terpolymers comprise three or more olefinic repeating units, optionally grafted.

The olefinic repeating units preferably comprise units derived from alkenes, particularly ethylene or propylene.

The polyolefin(s) implemented in the present invention is/are by definition thermoplastic(s).

It is meant by "grafted" one or more grafted function(s) or group(s) which can be one or more linear or branched alkyl groups comprising from 1 to 10 carbon atoms, preferably from 1 to 5 carbon atoms, for example a methyl group, an ethyl or propyl group, or one or more ester function(s), for example an alkyl ester whose alkyl group comprises from 1 to 5 carbon atoms, or one or more acrylate (R—O—CO—CH=CH$_2$) or acryloyl (H$_2$C=CH—CO—R) function(s), particularly R is an alkyl group comprising from 1 to 10 carbon atoms.

The polyolefin(s) mentioned in the present text, particularly for the main upper material and/or the main sole material and/or the auxiliary upper and/or or sole material(s), is/are preferably chosen among a list I comprising (particularly consisting of) polypropylene; polyethylene, particularly high-density polyethylene, very high-density polyethylene, low-density polyethylene, and very low-density polyethylene (LLDPE); polymethylpentene (PMP), polybutene-1 (PB-1), polyisobutene; preferably among the polypropylenes and the polyethylenes, particularly the polyethylene is chosen among the high-density polyethylene, the very high-density polyethylene, the low-density polyethylene, and the very low-density polyethylene (LLDPE).

The polyolefin(s) mentioned in the present text, particularly for the main upper material and/or the main sole material and/or the auxiliary upper and/or or sole material(s), can also be chosen among a list II comprising (particularly consisting of) poly(ethylene-vinyl acetate) (EVA) (particularly resulting from the copolymerization of the ethylene and of the vinyl acetate, it is an olefin copolymer), in particular non-cross-linked; the ethylene polyvinyl alcohol.

The polylefin(s) mentioned in the present text for the main sole material and/or the auxiliary sole material(s) can be chosen among olefin-based mineral oils, such as poly-alpha-olefins, particularly which are plasticizers of the styrenic thermoplastic elastomers.

The polyolefin can be a biosourced or petrosourced, particularly biosourced, polyolefin that is to say derived from renewable material(s), for example it may be a biosourced polyethylene derived from sugar cane.

It is meant by "biosourced material" any material derived from renewable material(s), as opposed to petrosourced material.

The biosourced polyolefin can have an origin called direct origin that is to say it is directly derived from renewable material(s), or indirect origin that is to say it is derived from a mixture of renewable material(s) and petrosourced material(s) and/or recycled material(s). In the latter case, the polyolefin is defined by obtaining a certificate established according to the "mass balance approach" principle defining the proportion of recycled and/or biosourced material(s) used to obtain it.

Olefinic Thermoplastic Elastomers

One/the olefinic thermoplastic elastomer(s) mentioned in the present text, particularly for the main upper material and/or the main sole material and/or the auxiliary upper and/or sole material(s), is/are chosen among:
- the polyisobutylenes (PIB); and/or
- the ethylene, propylene and diene terpolymers (EPDM); the ethylene and propylene copolymers; the ethylene and alpha-olefin copolymers, for example the ethylene and butene copolymers or the ethylene and octene copolymers, and a mixture thereof; preferably the EPDM and the ethylene and propylene copolymers; and/or
- the mixtures of a polyolefin, particularly polypropylene, with one or more olefinic thermoplastic elastomer(s), unvulcanized, and possibly one or more plasticizers (for example mineral or naphthenic or paraffinic oil(s)), said olefinic thermoplastic elastomer(s) can be the ethylene and propylene copolymers, the ethylene, propylene and diene terpolymers, the ethylene and alpha-olefin copolymers (for example the ethylene and butene copolymers or the ethylene and octene copolymers).

Vulcanized Thermoplastic Elastomers

One/the vulcanized thermoplastic elastomer(s) (TPE-V) mentioned in the present text, particularly for the main upper material and/or the main sole material and/or the auxiliary upper and/or sole material(s) is/are preferably:
- a mixture of a vulcanized olefinic elastomer (particularly forming the rubber phase) and of a polyolefin (in particular as defined in the present text, more particularly forming the thermoplastic phase), particularly the polypropylene, or
- a mixture of a vulcanized olefinic elastomer (particularly as defined in the present text and vulcanized, more particularly forming the rubber phase) and of a styrenic thermoplastic elastomer (particularly as defined in the present text, more particularly forming the thermoplastic phase), particularly the SEBS or SBS.

The vulcanization generally takes place during the extrusion-granulation step. Preferably, the highly vulcanized rubber phase is dispersed in the thermoplastic phase. This elastomer has the advantage of presenting good adhesion to the olefinic polymers, such as the polypropylene and the polyethylene. This vulcanization is known in the state of the art as a dynamic vulcanization during which the elastomer is vulcanized during its mixing in the molten state with a suitable thermoplastic polyolefin.

Said vulcanized olefinic elastomer is preferably chosen among the ethylene, propylene, and diene terpolymers (EPDM); the ethylene and propylene copolymers; the ethylene and alpha-olefin copolymers, for example the ethylene and butene copolymers or the ethylene and octene copolymers, and a mixture thereof; preferably the EPDM and the ethylene and propylene copolymers.

It is considered in the present text that the polyurethanes are not vulcanized thermoplastic elastomers.

Styrenic Thermoplastic Elastomers

One/the styrenic thermoplastic elastomer(s) mentioned in the present text, particularly for the main upper material and/or the main sole material and/or the auxiliary upper and/or sole material(s), is/are preferably chosen among the thermoplastic elastomers comprising styrenic repeating units (TPE-S) (particularly a styrene group: —CH($C_6H_5$)—$CH_2$), still preferably among the thermoplastic elastomers comprising one or more styrenic block(s) and optionally one or more olefin (optionally grafted) block(s), preferably among the poly(styrene-ethylene-butylene-styrene) (SEBS); the poly(styrene-butadiene-styrene) (SBS); the poly(styrene-butadiene) (SBC); the poly(styrene-isoprene-styrene) (SIS); the poly(styrene-ethylene-propylene-styrene) (SEPS)), for example marketed under the brand Septon SEPS® by the company Kuraray, or Kraton GR by the company Kraton.

A styrenic thermoplastic elastomer according to the invention can be grafted, for example the SEBS can be grafted, for example with one or more acid anhydride(s), such as maleic anhydride, and/or one or more carboxylic acids(s) and/or one or more vinyl function(s).

The grafting of the styrenic thermoplastic elastomer has the function of improving the adhesion of the sole, for example of the outsole, to another sole, for example an intermediate sole, and/or to the upper when the sole is directly injected onto the upper.

Advantageously, the thermoplastic elastomers selected within the framework of the present invention have better processability and an associated energy cost lower than the thermosetting elastomers by the conventional thermoplastic methods such as injection molding, extrusion, thermoforming, blow-molding, etc.

Definitions

Advantageously, the main upper material and/or the main sole material, and possibly one or more auxiliary upper material(s) and/or one or more auxiliary sole material(s), has/have (in particular each) a melting temperature (Tf) and/or a glass transition temperature (Tg), particularly said melting temperature(s) is/are greater than said glass transition temperature(s).

In the present text, it is meant by "shoe" any footwear article not comprising the boots.

In the present text, it is meant by "boot" a rain or snow boot or a clog, particularly a footwear article comprising an upper and a sole portion comprising a polymer material in common forming a majority by mass of the upper and of the sole, said upper and the sole being molded together.

In the present text, it is meant by "thermoplastic material" any material able to be softened or melted by heating, sufficiently, without degradation of the latter, so that it can be implemented in a plastic transformation method, such as those mentioned above, and this several times.

It is meant by "majority by mass of the upper" that:
- the mass fraction of said main upper material, measured relative to the total mass of the upper, is greater than the mass fraction of any other material that the upper comprises; or
- the mass fraction of said added main upper material of the respective mass fraction(s) of the auxiliary upper material(s), measured relative to the total mass of the upper, is greater than the mass fraction of any other material that the upper comprises and not chosen from the main list defined in the present text; or
- the fraction of surface occupied by the main upper material measured relative to the total surface of the upper is greater than the fraction of surface occupied by any other material that the upper comprises; or
- the fraction of surface occupied by the added main upper material of the respective surface fraction(s) of the auxiliary upper material(s), measured relative to the total surface of the upper is greater than the fraction of surface occupied by any other material that the upper comprises and not chosen from the main list defined in the present text.

The main upper material, and possibly the auxiliary upper material(s) can thus represent for example 30%, 40% or even 50% or 60% by mass of the upper or of the external surface of the upper.

It is meant by "main upper material" that the mass or surface fraction of the main upper material is greater than the mass or surface fraction of any auxiliary upper material, and possibly greater than the mass or surface fraction of any other material that the upper comprises, not chosen from the main list defined in the present text. When the main upper material represents for example 30% by mass of the upper, the auxiliary material(s) represent(s) (each) less than 30% by mass of the upper.

The external surface of the upper is preferably calculated from an upper projected flat. It may be for example the surface of the pattern of the upper before it is shaped in three dimensions by stitching, but comprising all of the upper components disposed along its external surface.

It is meant by "total mass of the upper" the mass of the upper on the finished shoe with all its components.

It is meant by "majority by mass of the sole" that:
the mass fraction of said main sole material, measured relative to the total mass of the sole, is greater than the mass fraction of any other material that the sole comprises; or
the mass fraction of said added main sole material of the respective mass fraction(s) of the auxiliary sole material(s), measured relative to the total mass of the sole, is greater than the mass fraction of any other material that the sole comprises, not chosen from the main list defined above in the present text.

The main sole material, and possibly the auxiliary sole material(s) can thus represent 40% or 50% or 60% by mass of the sole.

It is meant by "main sole material" that the mass fraction of the main sole material is greater than the mass fraction of any auxiliary sole material, and optionally greater than the mass fraction of any other sole material not chosen from the main list defined in the present text.

For example, when the main sole material represents 30% by mass of the sole, the auxiliary material(s) represent (each) less than 30% by mass of the sole.

In the present text, the mass fraction of a main or auxiliary upper material in the upper is the ratio of the mass (g) of said main or auxiliary upper material to the total mass (g) of the upper.

For the calculation of the total mass of the upper in order to define the mass fraction(s) of the main upper material(s) and/or of the auxiliary upper material(s), all of the upper material(s) covering the top of the foot, that is to say disposed above the bearing plane of the foot are considered. The possible material(s) of the sole in connection with the upper (sole portion of a knitted sock for example) is/are counted as part of the sole, particularly of the midsole or of the outsole.

In the present text, the fraction of surface occupied by the main or auxiliary upper material in the upper is the ratio of the surface occupied (cm$^2$) by said visible material to the total external surface (cm$^2$) of the upper projected flat, the external surface of the upper being the one oriented outside the shoe.

In the present text, the mass fraction of a main or auxiliary sole material in the sole is the ratio of the mass of said main or auxiliary material to the total mass of the sole.

When a first upper component comprises the main upper material and a second upper component comprises said main upper material, the first component and the second component each comprise a main upper material in the same base polymer, which can be a polyolefin, for example the PP or the PE. The base polymer material of the first component may however be different from the base polymer material of the second component due to hardness or its intrinsic properties (molar mass, degree of polymerization, amount of monomer(s)) or its presentation (foam, textile, foamed beads, etc.).

The footwear article, particularly the upper and/or the sole, can comprise approximately 20% at most, particularly 15% at most, more particularly 10% at most, in particular 5% at most, by mass relative to its total mass, of one or more contaminant material(s), that is to say which is/are not chosen among the polyolefins, the styrenic thermoplastic elastomers, the olefinic thermoplastic elastomers, and the vulcanized thermoplastic elastomers. Said contaminant material(s) can be chosen among the polyurethanes, the polyamides or the polyesters (for example the polyethylene terephthalate (PET), or the polybutylene terephthalate (PBT)). These contaminant materials can be derived, for example, from recycled materials.

In a sub-variant embodiment, the footwear article is a boot. The boot comprises an outsole and an upper. The upper comprises a bottom upper portion covering the foot, particularly the forefoot, the instep, the medial region, the lateral region, and the hindfoot. The upper also comprises a top upper portion at least partly covering the leg.

Preferably, the bottom upper portion and the outsole are co-injected.

In a sub-variant, the footwear article comprises a clog and a flexible tubular portion configured to wrap at least partly the leg.

Preferably, the clog comprises a sole, in particular an outsole, and a bottom upper portion.

Preferably, the flexible tubular portion is a top upper portion.

In the two previous sub-variants, the sole, in particular the outsole, is particularly obtained by injection-molding of a composition comprising the main sole material, and the bottom upper portion is obtained by injection-molding, on the sole, in particular the outsole, particularly in a still softened state, of a composition comprising the main upper material.

Said sole and the bottom upper portion can advantageously form a clog.

In the two previous sub-variants, preferably, the main sole material is a styrenic thermoplastic elastomer, particularly a SEBS, and the main upper material is a styrenic thermoplastic elastomer, particularly a SEBS.

The top upper portion comprises one or more foam(s) and one or more textile(s) in at least one auxiliary upper material, particularly chosen among the polyolefins. The upper can also comprise one or more foam(s) and/or one or more textile(s) forming an inner slipper disposed in the foot-accommodating space of the boot and covering all or part of the inner face of the injected bottom upper portion.

Preferably, the mass fraction of the main sole material in the sole is greater than or equal to 45%, more preferably greater than or equal to 50%, particularly less than or equal to 70%.

The outsole can also comprise a first auxiliary sole material, for example a polyolefin, in particular the polypropylene.

The mass fraction of the first auxiliary sole material in the sole is greater than or equal to 5% and less than or equal to 40%, in particular less than or equal to 30%. Preferably, the mass fraction of the main upper material is greater than or equal to 40%, more preferably less than or equal to 60%.

The upper can comprise a first auxiliary upper material which is a polyolefin, particularly the polypropylene, whose mass fraction in the upper is greater than or equal to 10%, preferably less than or equal to 35%.

Preferably, the ratio of the mass of the main upper material and of the mass of the first auxiliary upper material to the total mass of the upper is greater than or equal to 60%, more preferably greater than or equal to 70%.

In one variant embodiment, the main upper material is selected among one of the following materials: a polyolefin, an olefinic thermoplastic elastomer, or a vulcanized thermoplastic elastomer, preferably among a polyolefin or an olefinic thermoplastic elastomer, more preferably a polyolefin.

In one variant embodiment, the main sole material is selected among one of the following materials: a styrenic thermoplastic elastomer, a polyolefin or a vulcanized thermoplastic elastomer.

In one variant embodiment, the main sole material is a styrenic thermoplastic elastomer.

In one variant embodiment, the main sole material is a polyolefin, in particular the polypropylene.

In one variant embodiment, the sole and the upper are manufactured individually and joined to each other.

The sole is preferably secured to the upper by bonding and/or by stitching and/or by welding (ultrasonic welding, high-frequency welding or thermal welding), for example in a Strobel type construction.

The sole can be injected and form a sole component or an outsole and/or a midsole.

In one variant embodiment, the upper comprises a yarn comprising a material chosen among a polyolefin, an olefinic thermoplastic elastomer, or a vulcanized thermoplastic elastomer.

Preferably, the polyolefin is the polypropylene or the polyethylene.

Preferably, the yarn comprises the main upper material.

In one variant embodiment, the upper comprises a textile component, and the textile component comprises a yarn comprising the main upper material, particularly the main upper material is chosen among a polyolefin, an olefinic thermoplastic elastomer, or a vulcanized thermoplastic elastomer.

Preferably, the main upper material is the polypropylene or the polyethylene.

In one variant embodiment, the upper comprises a textile portion forming a foot-receiving area having an outer face, and at least one piece, particularly a strip, comprising an olefinic thermoplastic elastomer, said piece being secured to said outer face of the textile portion, and to said sole.

Advantageously, the textile portion forming a foot-receiving area comprises a textile component, particularly comprising a yarn comprising the main upper material, more particularly the main upper material is a polyolefin or an olefinic thermoplastic elastomer or a vulcanized thermoplastic elastomer.

Advantageously, the textile component can be as described in the present text.

Preferably, said piece is a piece of imitation leather.

Advantageously, said piece comprises a textile support and a polymeric layer comprising, particularly essentially consisting of, more particularly consisting of, said olefinic thermoplastic elastomer, said polymeric layer being secured to said textile support.

Even advantageously, the face of the piece comprising the textile support is oriented facing the outer face of the textile portion.

Preferably, the upper comprises one or more strip(s), more preferably arranged to run along, at least partly, the at least one of the following edges of the shoe: the front edge, the medial edge, the lateral edge, and the rear edge.

Preferably, said piece(s), particularly strip(s), is/are secured to the outer face of the textile portion forming a foot-receiving area, and to the sole.

Preferably, said piece(s), in particular strip(s), has/have (in particular each) a thickness greater than or equal to 0.5 mm and less than or equal to 3 mm.

Preferably, said at least one piece, in particular a strip, is secured to the outer face of said textile portion, and optionally to the sole, by fusion of at least part of its structure.

Preferably, at least one portion of said at least one piece, in particular a strip, is disposed between the sole and the outer face of the foot-receiving textile portion. Advantageously, the olefinic thermoplastic elastomer makes it possible to form a reinforcing piece, in particular a reinforcing strip, having an imitation leather appearance, which is compatible with the polymer material(s) of the textile portion and of the sole so it can be fusion-bonded.

In one embodiment, said piece is arranged so as to form a covering portion of all or part of the top of the foot, particularly comprises an opening for introducing the foot into said covering portion.

In one variant embodiment, the sole comprises a cellular component, particularly a foam, and/or foam beads, comprising a material selected among one of the following materials: a styrenic thermoplastic elastomer, an olefinic thermoplastic elastomer, a vulcanized thermoplastic elastomer, or a polyolefin, preferably among one of the following materials: an olefinic thermoplastic elastomer or a vulcanized thermoplastic elastomer, more preferably an olefinic thermoplastic elastomer.

Preferably, the foam beads are agglomerated into a block, particularly are bonded together to their surfaces by fusion.

Preferably, the cellular component has a volume density ($g/cm^3$) less than or equal to 0.75; still preferably less than or equal to 0.50.

Preferably, the cellular component is a midsole.

In one variant embodiment, the upper comprises a front toe box comprising the main upper material or an auxiliary upper material, and/or a rear counter comprising the main upper material or an auxiliary upper material.

The upper can comprise a rear counter or a front toe box comprising, or consisting of, an olefinic thermoplastic elastomer.

The upper can comprise a rear counter or a front toe box comprising, or consisting of, a styrenic thermoplastic elastomer, for example the SEBS, possibly mixed with at least one polyolefin.

The upper can comprise a rear counter or a front toe box comprising, or consisting of, a vulcanized thermoplastic elastomer.

In one variant embodiment, the upper comprises at least one passage eyelet for at least one lacing element, said at least one passage eyelet comprises a textile strip comprising at least one yarn comprising the main upper material or an auxiliary material upper, particularly the main upper material is a polyolefin.

In one variant embodiment, the upper comprises a foam component comprising the main upper material, particularly the main upper material is a polyolefin.

The upper can comprise one or more complex(es), a complex comprising a textile secured to said foam component, preferably the textile and the foam component comprise (particularly consist of) the main upper material, preferably made of polyolefin, for example of PP or PE.

Said foam component, possibly assembled with a textile, can be disposed in the rear heel region of the upper in order to provide comfort and/or in a medial region of the upper and/or in a lateral region of the upper.

In one variant embodiment, the upper and/or the sole each comprise(s) a material recycled from a sole and/or from the upper of another shoe, and/or a material recycled from a sole and/or or from the upper of a boot.

The recycled material preferably comprises the main upper material and/or the main sole material and/or the auxiliary upper and/or sole material(s).

The other shoe can be a shoe according to the invention.

In one variant embodiment, the ratio of the mass of the main upper material, and possibly of the mass of the auxiliary upper material(s), to the total mass of the upper is greater than or equal to 40%, preferably greater or equal to 50%.

In one variant, the ratio of the mass of said main upper material and of the mass of the auxiliary upper material(s), to the total mass of the upper is greater than or equal to 50%, and the main upper material and the auxiliary upper material(s) are selected among the polyolefins and the olefinic thermoplastic elastomers.

In one variant embodiment, the main sole material covers at least partly the upper, in particular the main upper material.

Preferably, the main sole material goes up substantially on the forefoot region and/or on the hindfoot region and/or on the medial region and/or on the lateral region of the upper.

In one variant, the main sole material is secured to the upper, in particular to the main upper material, without an intermediate binding agent, for example without a bonding agent or without stitching. In one variant embodiment, the ratio of the mass of the main sole material, and possibly of the mass of the auxiliary sole material(s), to the total mass of the sole is greater than or equal to 40%, preferably greater than or equal to 50%.

In one variant embodiment, the ratio of the mass of said main sole material and of the mass of the auxiliary sole material(s), to the total mass of the sole is greater than or equal to 50%, and the main sole material and the auxiliary sole material(s) are selected among: the polyolefins, the styrenic thermoplastic elastomers, and the vulcanized thermoplastic elastomers chosen among: a mixture of a vulcanized olefinic elastomer and of a polyolefin, and
    a mixture of a vulcanized olefinic elastomer and of a styrenic thermoplastic elastomer.

In one variant embodiment, the main upper material, and possibly the auxiliary upper material(s), and the main sole material, and possibly the auxiliary sole material(s), have a density (g/cm$^3$) less than or equal to 1.2, preferably less than or equal to 1.1, more preferably less than or equal to 1.05, preferably less than or equal to 1.

In one variant embodiment, the footwear article, particularly the shoe, in particular sports shoe, or the upper and/or the sole of the footwear article, in particular of said shoe, comprise(s) (in particular each):
    at most 10% by mass of one or more contaminant material(s) not chosen among the polyolefins, the styrenic thermoplastic elastomers, the olefinic thermoplastic elastomers, and the vulcanized thermoplastic elastomers,
    particularly at most 10% by mass of one or more thermoplastic contaminant material(s) and/or at most 5% by mass of one or more thermosetting contaminant material(s).

For example, if the contaminant material(s) consist(s) of thermoplastic contaminant material(s), the mass fraction of contaminant(s) in the shoe is 10% at most.

For example, if the shoe comprises 5% by mass of one or more thermosetting contaminant material(s), said shoe may still comprise at least 5% by mass of one or more thermoplastic contaminant material(s).

Preferably, the contaminant material(s) is/are chosen among: the polyurethanes, the polyamides or the polyesters (for example the polyethylene terephthalate (PET), or the polybutylene terephthalate (PBT)), preferably among the polyurethanes or the polyamides.

As developed above, the contaminant material(s) in the present text is/are not chosen among the polyolefins, the styrenic thermoplastic elastomers, the olefinic thermoplastic elastomers, and the vulcanized thermoplastic elastomers, particularly as defined in the present text.

In one variant embodiment, the footwear article, particularly the shoe, in particular sports shoe, or the upper and/or the sole of the footwear article, in particular of the shoe, comprise(s) (in particular each):
    one or more contaminant material(s), particularly chosen among the polyurethanes, the polyamides or the polyesters (for example the polyethylene terephthalate (PET), or the polybutylene terephthalate (PBT)), preferably chosen among the polyurethanes or the polyamides.

In one variant embodiment, the footwear article, particularly the shoe, in particular sports shoes, or the upper and/or the sole of the footwear article, in particular of the shoe, comprise(s) (each):
    at most 10% by mass of one or more contaminant material(s) chosen among the polyurethanes, the polyamides or the polyesters (for example the polyethylene terephthalate (PET), or the polybutylene terephthalate (PBT)), preferably chosen among the polyurethanes or the polyamides,
    particularly at most 10% by mass of one or more thermoplastic contaminant material(s) and/or at most 5% by mass of one or more thermosetting contaminant(s) chosen among the polyurethanes, the polyamides or the polyesters (for example the polyethylene terephthalate (PET), or the polybutylene terephthalate (PBT)), preferably chosen among the polyurethanes or the polyamides.

In the present text, it is meant by "thermosetting material", in particular "thermosetting contaminant material" any material not having a hot-transformation temperature by a plastic shaping method, for example by extrusion-injection, extrusion blow-molding, hot-pressing (thermocompression), extrusion-spinning, etc.

In the present text, it is meant by "thermoplastic material", in particular "thermoplastic contaminant material", any material having a hot-transformation temperature by a method for shaping plastic(s), for example by extrusion-injection, extrusion blow-molding, hot-pressing, extrusion-spinning, etc.

The inventors have advantageously determined that the levels of contaminants depending on whether they are thermoplastic or thermosetting must not exceed certain proportions in the footwear article so that the latter can be recycled without separation of its different components and so that the final recycled material presents satisfactory mechanical properties in many new applications.

A non-exhaustive explanation, particularly with regard to the thermosetting contaminants, is that the contaminant material(s) is/are disposed like nodules in the thermoplastic matrix derived from the main materials, and optionally from the auxiliary upper and sole materials.

In addition, the inventors have determined that the properties of the polymeric mixture derived from a footwear article can be improved in a surprising manner by a contaminant material.

Particularly, the abrasion resistance of the mixture is improved in a surprising manner when the shoe comprises one or more contaminant material(s) made of polyurethane or polyamide, particularly whose mass fraction is at most 10% in the shoe (see table in FIG. 5 attached). Above 10%, it has been observed that the abrasion resistance decreases.

The mass fraction of contaminant material(s) in the footwear article is then preferably greater than or equal to 0.5%, more preferably greater than or equal to 1%.

In one variant embodiment, the shoe comprises one or more contaminant material(s) chosen among the polyurethanes, said contaminant material(s) chosen among the polyurethanes represent(s) at most 10% by mass of said shoe, particularly the shoe comprises at most 10% by mass of one or more thermoplastic contaminant material(s) chosen among the polyurethanes and at most 5% by mass of one or more thermosetting contaminant material(s) chosen among the polyurethanes.

In one variant embodiment, the footwear article, particularly the shoe, in particular sports shoe, or the upper and/or the sole of the footwear article, in particular of the shoe, comprise(s) (in particular each) a foam in a contaminant material, particularly made of polyurethane, in particular thermoplastic.

In one embodiment, the sole or the upper comprises a foam in a contaminant material which represents at least 30% by volume, preferably at least 40% by volume, more preferably at least 50% by volume, preferably at least 60% or 70% by volume, of said sole or of said upper.

In one embodiment, said foam in a contaminant material represents at most 10% by mass of the footwear article, in particular of the shoe, when the contaminant material is thermoplastic, and/or at most 5% by mass of the article footwear, in particular of the shoes, when the contaminant material is thermosetting.

Said foam can be a foamed block or comprise expanded particles agglomerated together.

For example, the density of a polyurethane foam ranges from 0.040 Kg/liter to 0.4 Kg/liter, for example of the order of 0.055 Kg/liter while the density of a styrenic thermoplastic elastomer, such as the SEBS, is greater than or equal to 0.80 Kg/liter.

It is sometimes necessary to use some materials to provide specific functionalities to the footwear article, particularly when it is a sports shoe.

The variant embodiments and embodiments according to a first aspect of the invention can be combined independently of each other.

The present invention relates, according to a second aspect, to a method for manufacturing a footwear article, in particular a shoe, particularly according to any one of the variant embodiments according to a first aspect of the invention, said method advantageously comprising:
  providing an upper, a majority by mass of the upper, or a majority of the external surface of the upper, is made of a main upper material, and possibly one or more auxiliary upper material(s);
  injecting a sole, a majority by mass of the sole is made of a main sole material, and possibly one or more auxiliary sole material(s);

the main upper material, and possibly the auxiliary upper material(s), is/are selected among the following materials: the polyolefins, the styrenic thermoplastic elastomers, the olefinic thermoplastic elastomers, and the vulcanized thermoplastic elastomers; and the main sole material, and possibly the auxiliary sole material(s), is/are selected among the following materials: the polyolefins, the styrenic thermoplastic elastomers, the olefinic thermoplastic elastomers, and the vulcanized thermoplastic elastomers.

The definitions, and the mass fractions, of the main and/or auxiliary upper and/or sole materials with reference to the first aspect of the invention also apply to the second aspect of the invention.

The main upper material can be identical or different from the main sole material, that is to say it can be in the same base polymer material or in a different base polymer material than the base polymer material of the main sole material.

The injected sole can be an outsole or a midsole or a combination thereof.

In a first embodiment, the sole is injected directly onto the upper. Preferably, the upper is disposed on a foot-shaped preform, then the sole is injected onto the bottom portion of the upper. The bottom portion of the upper can be a mounting insole in connection with the bottom edges of the upper (for example when the upper is shaped in three dimensions using weld(s) and/or stitch(es) to cover the foot) and/or the textile sole portion of a textile upper component.

The textile upper component can be a planar textile component, shaped in three dimensions so as to form a foot-accommodating slipper, for example by stitching/welding.

The textile upper component can be a knitted sock comprising an integrated knitted sole portion, in particular hot-melt or thermo-compressed.

Advantageously, the upper is put into contact at least partly with the injected sole in a softened state, then the cooling of said sole at room temperature makes it possible to secure the upper to the sole.

Preferably, the securing is performed between the upper and the sole without a bonding agent.

The main and/or auxiliary sole and upper materials selected in the present invention make it possible to manufacture a sole by injecting it directly onto an upper without adhesion problems, thus simplifying the method and reducing the number of different materials used.

Preferably, the main sole material is preferably a styrenic thermoplastic elastomer, possibly mixed with an auxiliary sole material which is a vulcanized thermoplastic elastomer or a polyolefin or another styrenic thermoplastic elastomer.

The inventors have observed that this main sole material, particularly the TPE-S, in particular the SEBS (optionally grafted) or the SBS, has very good adhesion to the main upper material, particularly when it is a polyolefin or an olefinic thermoplastic elastomer.

The mixture injected to manufacture the sole can comprise, in addition to the main sole material, a plasticizer and/or a filler (for example calcium carbonate) and/or one or more foaming agent(s) (for example if it is the midsole).

The plasticizer can be chosen among the mineral oils and/or the naphthenic or paraffinic oils.

The sole injected on the upper can be an outsole or a midsole. In the latter case, at least one foaming agent is used mixed with the main sole material.

In a second embodiment, the sole and the upper are manufactured independently of each other and then assembled. The sole is then injected into a sole manufacturing step which is independent of the upper manufacturing step.

The sole is then secured, in particular bonded via a bonding agent to the bottom portion of the upper.

In a third embodiment, the injected sole can be obtained by bi-injection, in particular in combination with the first or second embodiment.

Preferably, a first mixture comprising the main sole material, possibly mixed with one or more auxiliary sole material (s), is injected into a first mold in the shape of a first sole, then a second mixture comprising the main sole material and possibly at least one foaming agent, possibly mixed with one or more other auxiliary sole material(s), is injected into a second mold in the shape of a second sole and cooperating with the first mold so that the second mixture is injected and foamed on the first uncooled mixture thus improving the adhesion between the first sole and the second sole.

The first sole can be the outsole and the second sole can be the midsole.

The first mixture can be different from the second mixture, for example in view of the plasticizer used and/or the color and/or the auxiliary sole material(s), preferably they comprise the same main sole material.

The first sole can also be an outsole in a first color, and the second sole can be an outsole in a second color different from the first color.

The sole obtained preferably comprises an outsole and an intermediate sole, or two outsoles, and can be secured by bonding to the upper, independently of the sole injection method.

This bi-injection can be carried out directly on the upper.

In one variant, the method comprises a step of treating at least part of the surface of the sole, in particular of the outsole and/or of the intermediate sole, and/or at least part of the surface of the upper, particularly of the surface of one or more textile component(s), so as to improve the adhesion of the sole to the upper and/or of the outsole to the intermediate sole and/or of a functional component (for example a lateral reinforcement, a front toe box or a rear counter) to the textile component(s) of the upper.

Said treatment step comprises a light abrasion step (in particular designated by buffing treatment), and/or a plasma treatment step, and/or a flame treatment step, and/or a corona treatment step.

This step allows securing two components together, possibly without a bonding agent.

This avoids the addition of material that could end up as a contaminant in the subsequent recycling methods.

In one variant, the main sole material, and possibly the auxiliary sole material(s), is/are derived at least partly from the recycling of at least one other shoe or at least one boot, particularly at least one footwear article according to any one of the variant embodiments or embodiments according to the first aspect of the invention.

In one variant, the method comprises a step of foaming a foam component comprising the main sole material or at least one auxiliary sole material on the sole injected in a softened state so as to at least partly secure said foam component to said sole, in particular without a bonding agent.

The bi-injection can be performed as described above.

The securing between the foam component and the sole is performed when the injected sole is in a softened state, that is to say before it is cooled at room temperature.

Advantageously, the foam component comprises said main sole material or an auxiliary sole material as described in the present text. The foam component is therefore compatible with the main sole material of the injected sole, which promotes its securing to the sole without an intermediate agent.

The present invention relates, according to a third aspect, to a method for recycling at least one footwear article, in particular a shoe, comprising the collection of at least one footwear article, in particular a shoe, according to any one of the variants and embodiments according to a first aspect of the invention, or obtained by the implementation of the manufacturing method according to any one of the variants and embodiments according to a second aspect of the invention, and the transformation of said at least a footwear article, in particular of said shoe, into thermoplastic granules.

The footwear article, in particular the shoe, collected is in a first step shredded so as to obtain shreds, particularly having at least one dimension of the order of at least 1 mm to 40 mm. Said shreds are carried in an extrusion-granulation device to obtain thermoplastic granules. They can first undergo a washing step to remove dust.

In the present text, it is meant by "thermoplastic granules" any granule having a hot-transformation temperature by a plastic shaping method, for example by extrusion-injection, extrusion blow-molding, hot-pressing, extrusion-spinning, etc.

Said thermoplastic granules thus have the behavior of a thermoplastic material when they are implemented in a hot-transformation method, even if they comprise one or more thermosetting material(s) but in small amounts so as not to alter their ability to be transformed like thermoplastics.

Preferably, the extrusion-granulation device is/comprises a twin-screw extruder. Advantageously, this type of extruder makes it possible to better mix the shredded material.

Advantageously, it is not necessary to separate the different components of the footwear article, in particular of the shoe, because they are compatible with each other for their implementation in methods for transforming the thermoplastic materials.

In one variant embodiment, the transformation step comprises, particularly in this order:
  a step of shredding said footwear article, particularly said at least one shoe (in particular sports shoe), to obtain shredded particles;
  a step of compacting said shredded particles to obtain shredded and compacted particles, particularly under heat or cold,
  a step of extruding-granulating said shredded and compacted particles to obtain granules that can be transformed by a plastic hot-transformation method.

Advantageously, the compaction step makes it possible to expel the air from the foamed and/or hollow recycled material(s).

Preferably, the compaction step is carried out under heat by heating said shredded particles, particularly at a temperature greater than or equal to 60° C. and less than or equal to 110° C., for example of the order of 70° C. to within +/−10° C.

In one variant, the recycling method comprises a step of hot-transforming at least part of said thermoplastic granules for the manufacture of a plastic piece, in particular forming at least partly an article for the practice of a sport.

In the present text, it is meant by "plastic piece forming at least partly an article for the practice of a sport" that said piece can form only part or substantially the entirety of a sports article.

Said plastic piece comprises one or more recycled material(s), particularly coming from said recycled thermoplastic granules, chosen among the polyolefins, the olefinic thermoplastic elastomers, the styrenic thermoplastic elastomers and the vulcanized thermoplastic elastomers, optionally mixed with one or more other material(s) petrosourced and/or bisourced and/or recycled and/or not resulting from the recycling method according to the invention.

Said plastic piece is advantageously a fin blade, or a fin comprising a fin blade and a housing for receiving the foot.

The plastic piece can be a handle, a zipper tip, a wheel, a lamp casing or a snorkel tip.

The plastic piece is not limited to the recycling in a sports article but can be implemented in any application for which the composition of the recycled footwear article has satisfactory mechanical properties.

In the present text, it is meant by "plastic" any material based on the implementation of one or more (co) (ter) polymer(s) transformed by a hot method of the extrusion-injection, extrusion-molding, extrusion blow-molding, thermocompression type, or any equivalent technique.

The present invention relates, according to a fourth aspect, to a plastic piece (particularly molded, more particularly of unitary molded construction), in particular forming at least partly an article for the practice of a sport, capable of being obtained by the recycling method according to any one of the variant embodiments according to a third aspect of the invention, particularly said piece is a fin blade or a fin comprising a fin blade and a housing for receiving the foot.

In one embodiment, said piece is a fin blade or a fin comprising a fin blade and a housing for receiving the foot, and said piece comprises a majority material by mass chosen among the styrenic thermoplastic elastomers (for example the SEBS), the polyolefins, the olefinic thermoplastic elastomers, and the vulcanized thermoplastic elastomers, preferably chosen among the styrenic thermoplastic elastomers.

It is meant by "majority material by mass" that the mass fraction of said material is the highest one of the material(s) used in the composition of said piece.

In one embodiment, said piece comprises a majority material by mass chosen among the styrenic thermoplastic elastomers, the polyolefins, and the olefinic thermoplastic elastomers, preferably chosen among the styrenic thermoplastic elastomers, the mass fraction of said majority material by mass in said piece is greater than or equal to 10%, preferably greater than or equal to 25%, more preferably greater than or equal to 35%, preferably greater than or equal to 45%, in particular greater than or equal to 55%.

In one embodiment, the mass fraction of said thermoplastic granules recycled in the plastic part is greater than or equal to 10%, preferably greater than or equal to 25%, more preferably greater than or equal to 35%, preferably greater than or equal to 45%, in particular greater than or equal to 55%, optionally greater than or equal to 80% or 90%.

In another embodiment, said piece comprises a recycled material chosen among the styrenic thermoplastic elastomers, the polyolefins, and the olefinic thermoplastic elastomers, preferably chosen among the styrenic thermoplastic elastomers, the mass fraction of said recycled material in said piece is less than or equal to at 25%, preferably less than or equal to 20%, more preferably less than or equal to 15%. In one embodiment, the mass fraction of said thermoplastic granules recycled in the plastic piece is less than or equal to 25%, preferably less than or equal to 20%, more preferably less than or equal to 15%.

The variant embodiments, embodiments and definitions of the first, second, third and fourth aspects of the invention can be combined with each other unless otherwise specified.

DESCRIPTION OF THE DRAWINGS

The invention will be better understood upon reading the description of two embodiments of the invention given by way of non-limiting examples, with reference to the figures in which:

FIG. 1 illustrates schematically in perspective a first example of a shoe according to the invention;

FIG. 2 represents the shoe of FIG. 1 according to the longitudinal cutting plane II-II represented in FIG. 1;

FIG. 3 illustrates schematically in perspective a second example of a shoe according to the invention;

FIG. 4 schematically illustrates in perspective a third example of a shoe according to the invention;

FIG. 5 is a table summarizing the mechanical properties measured on examples of polymer mixtures resulting from the recycling of shoes according to the invention.

DESCRIPTION OF THE EMBODIMENT

The shoe 10 represented in FIG. 1 comprises an outsole 20 whose majority by mass is made of a main sole material, and an upper 30 whose majority by mass is made of a main upper material.

The main sole material is advantageously a styrenic thermoplastic elastomer, particularly chosen among the SEBS (optionally grafted), the SBS, the SBC, the SIS, and the SEPS, in this specific example the SEBS.

The sole 20 can comprise a first auxiliary sole material, particularly a polyolefin, more particularly it is polypropylene.

The main upper material is preferably a polyolefin, particularly the polyethylene or the polypropylene, in this specific example the polypropylene.

Advantageously, the upper 30 comprises a lace 35 made of polypropylene, particularly comprising yarns made of braided polypropylene.

Advantageously, the upper 30 comprises a component 40 folded on itself and comprising a foam laminated on its both sides with a textile. The textiles are preferably made of polypropylene and/or polyethylene, particularly a fabric or a knit with polypropylene yarns and/or polyethylene yarns, preferably polypropylene yarns. The foam is preferably polyethylene foam.

The upper 30 can also comprise a foam component 50 housed in the fold of the outer component 40, preferably made of polyethylene, said foam improves the accommodation of the hindfoot.

The edges of the component 40 folded on itself can be secured according to any technique known to those skilled in the art, for example using one or more stitch(es), preferably made with one or more polyolefin, particularly polypropylene, yarn(s).

Preferably, the upper component 40 is arranged in the hindfoot region 12 and partly in the medial 18 and lateral 16 foot regions.

Advantageously, the upper 30 further comprises the upper component 42 arranged in the forefoot regions 14, and partly in the lateral 16 and medial 18 foot regions. The upper component 42 can comprise a knit or a fabric. The upper 30 can comprise other upper component(s). All of the upper components including the components 40 and 42 are preferably shaped in three dimensions using a mounting insole.

Preferably, the mounting insole is a non-woven fabric made of polyolefin, in particular made of polypropylene. The mounting insole is advantageously hot-melt along all or part of its surface to improve its tearing resistance.

The upper 30 comprises, as well as preferably any upper according to the invention, a hindfoot region 12, a forefoot region 14, a lateral region 16, a medial region 18 and an instep region 19 comprising a tongue.

The shaping of the component 40, with optionally other upper component(s), on a foot-shaped preform (called lasting operation) is performed for example using a polypropylene cord (for example a circular braid not represented) tensioning the bottom edges of the textile component 40 and optionally of the other upper component(s).

The shoe 10 can also comprise lacing eyelets 55 in the main molded upper material, for example lacing eyelets 55 made of polypropylene.

The shoe 10 can also comprise a non-woven fabric made of polypropylene or polyethylene coated in whole or in part with a poly(ethylene-vinyl acetate) (EVA) coating making it possible to secure by bonding, when the EVA is activated by heating, the lacing eyelets 55 to the outer textile component 50.

The shoe 10 can comprise textile, in particular woven, strips 60 and 61 made of polyethylene and/or polypropylene, particularly comprising polypropylene yarns and/or polyethylene yarns, in particular polypropylene yarns. Each textile strip 60 and 61 comprises a lacing area 62 forming a sheath for the passage of a lace.

The textile strips 60 and 61 preferably each have a width 11 and 12 greater than or equal to 5 mm, particularly greater than or equal to 10 mm, more particularly greater than or equal to 15 mm.

Preferably, the textile strip 60 comprises a first end 64 and a second end 66 secured to the component 40. The first and second ends 64, 66 are spaced from each other so that the textile strip 60 forms an inverted V.

Preferably, the textile strip 61 comprises a first end 65 and a second end 67, substantially superimposed and secured to the component 40.

Preferably, the lacing area 62 comprises a portion folded on itself of the textile strip 60 or 61 and thus forming a sheath for the passage of a lace.

The textile strips 60 and 61 also form lateral reinforcement areas.

The upper 30 can comprise a rear counter 70 secured in the hindfoot region 14 of the component 40. This rear counter 70 is preferably a molded piece made of polypropylene.

The upper 30 can also comprise a hard toe box 90 in a molded material, for example in the main upper material, preferably in a polyolefin, an olefinic thermoplastic elastomer, or a vulcanized thermoplastic elastomer, or a styrenic thermoplastic elastomer, such as the SEBS.

For this specific embodiment, the main upper material of the upper 30 is a polyolefin, particularly the polypropylene. It is indeed the base thermoplastic material whose mass fraction constitutes the major part, that is to say is the largest mass fraction compared to the mass fractions of other materials.

The upper 30 also comprises a first auxiliary upper material, different from the main upper material, which in this specific example is the polyethylene.

In this specific example, the mass fraction of polyolefin in the upper is of the order of 55.17%, particularly the mass fraction of polypropylene (main upper material) in the upper is of the order of 44.83%, and the mass fraction of polyethylene (first auxiliary upper material) is of the order of 10.34%. The mass fraction of olefinic thermoplastic elastomer (TPO) in the upper is of the order of 27.59% (second auxiliary upper material), and finally the mass fraction of glue is of the order of 17.24%.

The ratio of the mass of the main upper material 30, in this specific example the polypropylene, and of the mass of the auxiliary upper materials 30, for example made of PE and TPO, relative to the total mass of the upper 30, is greater than or equal to 80%, in particular of the order of 82% or more if the used glue is made of EVA. This ratio preferably tends towards 100%. When the materials are recycled, there may remain one or more contaminant material(s) whose mass fraction however remains low, for example of the order of 5% or less.

The shoe 10 in this embodiment is manufactured according to a traditional Strobel type construction. The outsole 20 can be secured to the upper 30 by bonding. The outsole 20 and the upper 30 are therefore manufactured separately, then secured to each other.

Alternatively, it is possible for the outsole 20 to be manufactured at the same time as it is secured to the upper. In this case, the outsole is directly injected onto the upper that is to say onto the bottom upper portion 30. Advantageously, the main material of the upper 30 is compatible with, or in the same base thermoplastic material, the main sole material, so that the outsole adheres to the upper, preferably without the use of an outer binding agent.

Preferably, the mass fraction of the main sole material, particularly the SEBS, in the outsole is of the order of 65%. The mass fraction of polyolefin, in particular of polypropylene mixed with the SEBS, in the outsole is of the order of 20%. The mass fraction of filler (for example of calcium carbonate) in the outsole is of the order of 5%. Finally, the mass fraction of plasticizer in the outsole is of the order of 10%.

Advantageously, the shoe 10 essentially comprises polypropylene, polyethylene, a TPO and SEBS, the SEBS constituting the major part in the sole and the polypropylene constituting the major part in the upper. The recycling of the shoe is thus made easier since it is not necessary to separate the different components. The shoe is shredded then the shreds are transformed into thermoplastic granules able to be transformed by a traditional technique for shaping the thermoplastics. The thermoplastic granules therefore comprise a thermoplastic mixture comprising the materials selected in the present invention which are compatible with each other during their hot-transformation, and have good adhesion with each other.

The thermoplastic granules can thus be advantageously extruded and injected to manufacture all or part of an outsole or a midsole.

The thermoplastic granules can also be transformed to manufacture a front toe box or a rear counter or even lacing eyelets, a foam component or agglomerated or non-agglomerated foam beads.

FIG. 3 represents a second example mentioned without limitation of a shoe 100 according to the invention, particularly a football shoe, comprising an outsole 120 and an upper 130. The outsole 120 can be manufactured independently of the upper 130, and assembled to the latter by bonding for example or even be injected directly onto the upper 130. The main sole material is in this specific example a polyolefin, particularly the polypropylene.

Preferably, the mass fraction of the main sole material in the outsole 120 is of the order of 90-95%. The outsole 120 further comprises a filler, one or more pigment(s), and possibly one or more anti-UV agent(s). The main upper material is an olefinic thermoplastic elastomer, particularly an EPDM mixed with the polypropylene and optionally a plasticizer. The mass fraction and the surface fraction of the main upper material in the upper 130 are respectively of the order of 44.26% and 21.69%. The upper 130 also comprises several auxiliary material(s) according to the invention, and particularly polypropylene (first auxiliary material) whose mass fraction and surface fraction in the upper are respectively of the order of 37.40% and 51.97%, and polyethylene (second auxiliary material) whose mass fraction and surface fraction are respectively of the order of 3.58% and 26.40%. The upper 130 also comprises one or more adhesive element (s) whose mass fraction is of the order of 14.75%. The mass fraction and the surface fraction of polyolefins and of TPO in the upper are respectively of the order of 85% and 100%.

FIG. 4 represents a third example mentioned without limitation of a shoe 200 according to the invention, comprising an outsole 220 and an upper 230. The outsole 220 can be manufactured independently of the upper 230, and assembled to the latter by bonding for example or be injected directly onto the upper 230. The main sole material is in this specific example a SEBS. The main upper material is in this specific example a polyolefin, particularly the polypropylene.

The upper 230 comprises a textile portion 240 forming a foot-receiving area having an outer face 245, and four strips 250, 251, 252 in an olefinic thermoplastic elastomer secured to the outer face 245 and to said outsole 220. A portion of each of the strips is disposed between the outsole 220 and the outer face 245 of the textile portion 240. A strip 250 is disposed along the front edge 205 of the shoe 200, and extends from a lateral side to a medial side of the shoe 200. A strip 251 is disposed along the rear edge 206 of the shoe 200, and extends from a lateral side to a medial side of the shoe 200. A strip 252 is disposed partly along the medial side 207 of the shoe 200, and extends between the front strip 250 and the rear strip 251. A strip, not visible in the photography of FIG. 4, is disposed partly along the medial side of the shoe 200, and extends between the front strip 250 and the rear strip 251.

Advantageously, the textile portion 240 forming a foot-receiving area comprises a textile component which comprises a yarn comprising the main upper material, particularly the main upper material is a polyolefin or an olefinic thermoplastic elastomer.

Preferably, the four strips, including the strips 250-252, are imitation leather type strips.

Advantageously, each strip comprises a polymer layer based on an olefinic thermoplastic elastomer, said polymer layer being disposed on a textile substrate. Said strips are thus advantageously compatible with the polymer material (s) of the textile portion 240 and of the outsole 220 so that they can be at least partially bonded by fusion of their structures to the textile portion 240 and to the outsole 220. Said strips including the strips 250-252 are bonded to the outer face 245 of the textile portion 240 so that the textile substrates are oriented facing the outer face 245.

The strip, such as one of the strips 250 to 252, may have a configuration different from that of a strip depending on the functions to be performed on the shoe. Generally, said strip can be a piece of imitation leather type having a shape determined according to its final function. In this specific example, the outer faces of the strips 250 to 252 are substantially smooth, but they may comprise one or more relief pattern(s) imparted to the polymer layer, for example by calendering.

The table in FIG. 5 summarizes the mechanical properties measured on examples of polymer mixtures resulting from the recycling of shoes according to the invention. The mixture of example 1 results from the recycling of a shoe not comprising any contaminant material within the meaning of the present text. The recycled shoe to obtain the mixture of Example 1 thus comprises 50 g of polypropylene (PP), 12 g of polyethylene (PE), 250 g of styrene-ethylene-butadiene-styrene (SEBS), and 25 g of a vulcanized thermoplastic elastomer (TPV, in this specific example the EPDM (ethylene-propylene-diene)/PP (polypropylene)).

The shoe recycled to obtain the mixture of Example 2 is identical to the shoe of Example 1 with the difference that the sole of the shoe recycled in this Example 2 comprises thermoplastic polyurethane whose mass fraction is 2%.

The shoe recycled from the mixture of Example 3 is identical to the shoe of Example 2 with the difference that the mass fraction of thermoplastic polyurethane in the shoe is 5%.

The shoe recycled from the mixture of Example 4 is identical to the shoe of Example 2 with the difference that the mass fraction of thermoplastic polyurethane in the shoe is 10%.

The shoe of the mixture of Example 5 is identical to the shoe of Example 1 with the difference that the shoe of Example 5 comprises 2% by mass of thermoplastic polyamide coming from a polyamide hook-and-loop fastening system of the recycled shoe.

It is noted that the presence of polyurethane and polyamide, at most 10% by mass of the shoe, makes it possible to improve the breaking strength, but also, surprisingly, the abrasion resistance. Beyond 10% by mass of polyurethane, a reduction in the abrasion resistance is observed.

Furthermore, the recycled mixtures obtained are perfectly hot-transformable (extrusion-injection or blow-molding, or by hot-pressing, extrusion molding, etc.) while maintaining final properties allowing them many new applications.

The invention claimed is:

1. A shoe that comprises:
   an upper comprising a main upper material and one or more auxiliary upper material(s), wherein a majority by mass of the upper is made of the main upper material; and
   a sole, wherein a majority by mass of the sole is made of a main sole material;
   wherein the main upper material, and the one or more auxiliary upper material(s) are selected among the following materials: polyolefins and olefinic thermoplastic elastomers;
   wherein the main sole material is is a styrenic thermoplastic elastomer;
   wherein the upper comprises a textile component, said textile component comprising a yarn comprising the main upper material;
   wherein the ratio of the mass of the main upper material and of the one or more auxiliary upper material(s) to the total mass of the upper is greater than or equal to 60%;
   wherein the ratio of the mass of the main sole material to the total mass of the sole is greater than or equal to 50%.

2. The shoe according to claim 1, wherein the sole and the upper are manufactured individually and joined to each other.

3. The shoe according to claim 1, wherein the textile component comprises a textile portion forming a foot-receiving area having an outer face, and wherein the upper comprises also at least one piece comprising an olefinic thermoplastic elastomer, said piece being secured to said outer face of the textile portion, and to said sole.

4. The shoe according to claim 3, wherein said piece comprises a textile support and a polymeric layer comprising said olefinic thermoplastic elastomer, said polymeric layer of said piece being secured to said textile support, the textile support of said piece being oriented facing the outer face of the textile portion of the textile component of the upper.

5. The shoe according to claim 1, wherein the sole comprises a cellular component comprising a material selected among at least one of: a styrenic thermoplastic elastomer, an olefinic thermoplastic elastomer, a mixture of a vulcanized olefinic elastomer and of a polyolefin, a mixture of a vulcanized olefinic elastomer and of a styrenic thermoplastic elastomer, and a polyolefin.

6. The shoe according to claim 1, wherein the upper comprises at least one passage eyelet for at least one lacing element, said at least one passage eyelet comprises a textile strip comprising at least one yarn comprising the main upper material.

7. The shoe according to claim 1, wherein the upper comprises a foam component comprising the main upper material.

8. The shoe according to claim 1, wherein the ratio of the mass of the main upper material to the total mass of the upper is greater than or equal to 40%.

9. The shoe according to claim 1, wherein the shoe comprises at most 10% by mass of one or more contaminant material(s) not chosen among the polyolefins, the styrenic thermoplastic elastomers, the olefinic thermoplastic elastomers, and the vulcanized thermoplastic elastomers.

10. The shoe according to claim 1, characterized in that the shoe comprises one or more contaminant material(s) chosen among the polyurethanes, said contaminant material(s) chosen among the polyurethanes represent(s) at most 10% by mass of said shoe, particularly the shoe comprises at most 10% by mass of one or more contaminant thermoplastic material(s) chosen among the polyurethanes and at most 5% by mass of one or more thermosetting contaminant material(s) chosen among the polyurethanes.

11. The shoe according to claim 1, wherein the main upper material and the main sole material have a density (g/cm3) less than or equal to 1.1, preferably less than or equal to 1.05.

12. The shoe according to claim 1, wherein the ratio of the mass of the main upper material and of the auxiliary upper material(s) to the total mass of the upper is greater than or equal to 80%.

13. The shoe according to claim 1, wherein the sole comprises foam beads comprising a material selected among: a styrenic thermoplastic elastomer; an olefinic thermoplastic elastomer; a mixture of a vulcanized olefinic elastomer and of a polyolefin; a mixture of a vulcanized olefinic elastomer and of a styrenic thermoplastic elastomer; and a polyolefin.

14. The shoe according to claim 1, wherein the sole comprises one or more auxiliary material(s) chosen among polyolefins, and wherein the ratio of the mass of the main sole material and of the one or more auxiliary sole material(s) to the total mass of the upper is greater than or equal to 80%.

15. The shoe according to claim 1, wherein the sole is an outsole.

16. A shoe, wherein it comprises:
an upper comprising a main upper material and one or more auxiliary upper material(s), a majority of the surface of the upper is made of the main upper material;
a sole wherein a majority by mass of the sole is made of a main sole material;
wherein the main upper material and the one or more auxiliary upper material(s) are selected among polyolefins and;
wherein the main sole material is a styrenic thermoplastic elastomer;
wherein the upper comprises a textile component, said textile component comprising a yarn comprising the main upper material,
wherein the ratio of the surface of the main upper material and of the one or more auxiliary upper material(s) to the total surface of the upper is greater than or equal to 60%
wherein the ratio of the mass of the main sole material to the total mass of the sole is greater than or equal to 50%.

17. The shoe according to claim 16, wherein the sole is an outsole.

18. A shoe that comprises:
an upper comprising a main upper material and one or more auxiliary upper material(s), wherein a majority by mass of the upper is made of the main upper material; and
a sole, wherein a majority by mass of the sole is made of a main sole material;
wherein the main upper material and the one or more auxiliary upper material(s) are selected among the following materials: polyolefins and olefinic thermoplastic elastomers;
wherein the main sole material is polyolefin,
wherein the upper comprises a textile component, said textile component comprising a yarn comprising the main upper material,
wherein the ratio of the mass of the main upper material and of the one or more auxiliary upper material(s) to the total mass of the upper is greater than or equal to 60%
wherein the ratio of the mass of the main sole material to the total mass of the sole is greater than or equal to 50%.

19. The shoe according claim 18, wherein the ratio of the mass of the main sole material to the total mass of the sole is greater than or equal to 80%.

20. The shoe according to claim 18, wherein the sole is an outsole.

* * * * *